United States Patent Office 3,793,388
Patented Feb. 19, 1974

3,793,388
SELECTIVE HYDROGENATION OF ACETYLENE FROM OLEFINS WITH A NICKEL ON ALUMINA CATALYST
Emory W. Pitzer, Bartlesville, Okla., assignor to Phillips Petroleum Company
No Drawing. Filed May 30, 1972, Ser. No. 257,796
Int. Cl. C07c 11/12
U.S. Cl. 260—677 A                                                8 Claims

ABSTRACT OF THE DISCLOSURE

A method for the selective hydrogenation of acetylene is described comprising contact of acetylene and an olefinic mixture with hydrogen in the presence of a catalyst consisting of nickel supported on alumina, wherein at least a substantial portion of the pores in the alumina have a diameter of at least 120 A.

---

This invention relates to a selective hydrogenation process employing a nickel supported alumina catalyst.

The selective hydrogenation of acetylene in the presence of an olefinic hydrocarbon mixture in the presence of nickel catalysts supported on alumina is known to the art. U.S. Pat. 3,444,256 discloses the use of nickel supported alumina catalysts for the selective hydrogenation of acetylene in hydrocarbon mixtures which are predominantly olefins. None of the prior art processes, however, describe the use of nickel alumina catalysts wherein substantial proportions of pores in the alumina have a diameter of at least 120 A.

An object of this invention is to provide a selective hydrogenation process for the hydrogenation of acetylene from olefinic hydrocarbons. Another object is to provide a selective hydrogenation process which can be carried out at moderate operating temperatures. These and other objects will be apparent from the written description and the appended claims.

In accordance with this invention, acetylene is selectively hydrogenated in hydrocarbon mixtures comprising acetylene and olefins in the presence of a nickel catalyst supported on alumina wherein at least a substantial portion of the pores in the alumina have a diameter of at least 120 A.

The aluminas that can be employed in the practice of this invention comprise large pore alumina wherein substantial surface area, i.e., at least 2 or more square meters per gram of alumina, consists of pores having diameters of at least 120 A. Preferred aluminas comprise aluminas wherein at least 4 square meters per gram of surface area are in pores having diameters of at least 120 A.

In the practice of this invention, measurement of the surface area in "large pores," i.e., pores having a diameter of at least 120 A., can be measured by mercury intrusion at 15000 p.s.i.g. with an Aminco Digital Readout Porosimeter (American Instrument Company, Inc.). Measurement of surface area of all pores having a diameter of at least 15 A. can be measured by a Perkin-Elmer Shell Model, 212C Sorptometer (Perkin-Elmer Corporation). Measurement of the surface area in "small pores," i.e., pores having a diameter of less than 120 A., can be calculated from the difference in surface areas determined by nitrogen adsorption and mercury intrusion.

In general, the aluminas employed comprise any alumina having any total surface area, e.g., from 2 to 350 square meters per gram (m.$^2$/g.), or even higher provided that a large portion of the surface area is in pores having a diameter of at least 120 A. Preferred aluminas have maximal surface area in pores having a diameter of 120 A., e.g., from as little as 0.5 percent to up to 100 percent of the total surface areas of the alumina.

The aluminas employed can be either naturally occurring or prepared synthetically to obtain the desired large pore surface area. Suitable methods for modification of the alumina pore size comprise collapsing small pores by sintering, steam treating at temperatures of about 1300° to about 1600° F. at which temperature the small pores are converted to large pores, or by such other methods of pore size adjustment as the treatment of the inactive alpha alumina with acid or ammonium nitrate as described in U.S. 2,800,518.

The catalysts of this invention comprise an alumina, as hereinbefore defined, associated with nickel. In general, the nickel-alumina catalyst composite will comprise from about 0.2 to about 8 mg. of nickel per square meter of the total alumina surface area. Preferably the catalyst contains from about 0.5 to 3 mg. of nickel per square meter of total of alumina surface area.

In general, the nickel can be brought into association with alumina by any of a number of known methods including impregnation or precipitation, either in inorganic or organic forms from inorganic or organic media. Regardless of the method of preparation, the catalyst composite is free of undesirable nonvolatile materials, dried and calcined in air at suitable temperatures. Thereafter, the catalyst is reduced in hydrogen employing conventional techniques, for example, by heating the catalyst in a stream of hydrogen at temperatures of at least 750° F. during a period of at least 30 minutes.

The catalyst can be employed in any conventional form such as pellets and in any suitable size.

In general, the nickel-alumina catalyst composities can be employed in the treatment of any hydrocarbon mixture that contains an acetylenic compound. In addition to acetylene compounds, the mixtures can contain cyclic and acyclic polyenes, organic sulfur compounds, organic peroxides, carbonyl compounds including carbon monoxide and the like and mixtures thereof.

In general, the process of this invention can be carried out by contacting an appropriate olefin mixture with hydrogen and the catalyst at temperatures within the range of from about 75° to about 200° F., preferably from about 100° to 150° F., at a pressure within the range of from about atmospheric to about 1000 p.s.i.g. and at a feed rate within the range of from about 0.1 to about 10 LHSV. Hydrogen can be suitably introduced with the olefin mixture in any quantity sufficient to provide the degree of selective hydrogenation desired. The process can be carried out employing the catalyst in a fixed or a fluidized bed.

The process of this invention is illustrated by the following example:

EXAMPLE I

Set out in Table I are the results of the selective hydrogenation of the acetylene contained in an acetylene-ethylene hydrocarbon mixture employing a large pore nickel-alumina catalyst of this invention.

The large pore alumina was impregnated with nickel by dissolving 12.3 grams Ni(NO$_3$)$_2$·6H$_2$O in 100 ml. of deionized water, thereafter adding about 150 ml. of large pore alumina in the form of ⅛-inch diameter cylinders to the nickel solution. The nickel nitrate solution and alumina were allowed to stand for 5 minutes. Unabsorbed nitrate solution was removed. The nickel impregnated alumina was heated at 220° F. for about 16 hours, and subsequently calcined at 1000° F. for 30 minutes A portion of the catalyst was placed in a fixed bed reactor and reduced by passing hydrogen over the catalyst at a rate of about 2000 GHSV, at a temperature of 800° F., at a pressure of about 350 p.s.i.g. for 15 hours. The temperature of the catalyst was reduced to about 100° F.

The nickel-alumina catalyst bed was subsequently contacted with a hydrogen-carbon monoxide stream containing by volume about 4 percent carbon monoxide at 3300 GHSV. Concurrently, a mixture of ethylene containing 3000 p.p.m. acetylene, 3000 p.p.m. CO, and 3000 p.p.m. ethane at 1700 GHSV was charged to the reactor. After approximately 1 hour the hydrogen-carbon monoxide stream was replaced at the same GHSV by a hydrogen stream free of carbon monoxide. Thereafter reactor samples were periodically taken under operating conditions set out in Table I hereafter.

TABLE I

| Catalyst | Run number | |
|---|---|---|
| | 1 | 2 |
| Surface area, m.²/gm.: | | |
| In large pores >120 A. diameter, (Hg) | 4.6 | 4.6 |
| In small pores <120 A. diameter, (by difference) | 1.1 | 1.1 |
| Total (N₂) | 5.7 | 5.7 |
| Composition Ni content: | | |
| Ni, wt. percent Al₂O₃ | 0.75 | 0.75 |
| Mg, Ni/m.₂ Al₂O₃ | 1.3 | 1.3 |
| Operating conditions: | | |
| Temperature, °F. | 132 | 131 |
| Catalyst age, hrs | 161 | 258 |
| Product analysis: | | |
| Acetylene, p.p.m | <1 | 2 |
| Ethane, p.p.m | 1,000 | 760 |

The above data illustrate the effective selective hydrogenation of acetylene in the presence of ethylene carried out in the presence of a nickel supported alumina catalyst at moderate operating temperatures of about 130° F.

Although the above example illustrated the process of this invention carried out in the presence of carbon monoxide, effective hydrogenation of acetylenic compounds is obtainable in absence of carbon monoxide contact of the catalyst either before and/or during the practice of the hydrogenation process of this invention.

Further modifications of the teachings of this invention in the selective hydrogenation of acetylene-olefin mixtures will be apparent to those skilled in the art.

What is claimed is:

1. A method for the selective hydrogenation of acetylene comprising contacting acetylene and an olefin with hydrogen in the presence of a nickel-alumina catalyst composite, said catalyst composite being characterized by nickel content of from about 0.5 to about 8 mg. per square meter of total alumina surface area, by at least two square meters per gram of alumina of said surface area being in the form of the surface of pores having diameters of at least 120 A, and by said alumina having at total surface area within the range of from 2 to 350 square meters per grams of said alumina.

2. A method in accord with claim 1 further comprising carrying out said contacting at a temperature within the range of from about 75 F. to about 200° F.

3. A method in accord with claim 2 further comprising carrying out said contacting at a pressure within the range of from about atmospheric to about 1000 p.s.i.g. and at an LHSV within the range of from about 0.1 to about 10.

4. A method in accord with claim 3 wherein said catalyst composite is characterized by a nickel content within the range of from about 0.5 to about 3 mg. per square meter of total alumina surface area and contains at least four square meters per gram of alumina in pores having diameters of at least 120 A.

5. A method in accord with claim 4 wherein said temperature is within the range of from about 100° F. to about 150° F.

6. A process in accord with claim 5 wherein said olefin is ethylene, said alumina has a total surface area of about 5.7 square meters per gram of alumina and about 4.6 square meters per gram of alumina in pores having diameters of at least 120 A. and said temperature is about 130° F.

7. A process in accord with claim 6 wherein the acetylene content of said ethylene is reduced from about 3000 p.p.m. acetylene to about 2 p.p.m. acetylene.

8. A method for the selective hydrogenation of acetylene comprising contacting acetylene and ethylene with hydrogen in the presence of a nickel-alumina catalyst composite at a temperature of about 130° F., said catalyst composite being characterized by a nickel content of about 1.3 mg. per square meter of total alumina surface area, a total alumina surface area of about 5.7 square meters per gram of alumina, about 4.6 square meters per gram of alumina in pores having diameters of at least 120 A., wherein the acetylene content of the ethylene is reduced from about 3000 p.p.m. acetylene to about 2 p.p.m. acetylene.

References Cited
UNITED STATES PATENTS

| | | | |
|---|---|---|---|
| 3,444,256 | 5/1969 | Engelhard et al. | 260—677 H |
| 2,956,090 | 10/1960 | Liethew et al. | 260—677 |
| 3,549,720 | 12/1970 | Wright et al. | 260—677 |
| 2,331,292 | 10/1943 | Archibald et al. | 252—463 |
| 3,353,910 | 11/1067 | Cornelius et al. | 252—463 |
| 3,367,741 | 2/1968 | Notari et al. | 252—463 |

DELBERT E. GANTZ, Primary Examiner

J. M. NELSON, Assistant Examiner

U.S. Cl. X.R.

260—683.9

UNITED STATES PATENT OFFICE

CERTIFICATE OF CORRECTION

Patent No. 3,793,388   Emory W. Pitzer   Dated: February 19, 1974

It is certified that error appears in the above-identified patent and that said Letters Patent are hereby corrected as shown below:

column 1, line 67, "(m.2/g.)" should read --- ($m^2/g$.) ---; column 2, line 9, "with acid" should read --- with nitric acid ---; line 31, "compossities" should read --- composites ---; line 67, a period should appear after "minutes"; column 3, line 51, "at total" should read --- a total ---; Column 4, line 3, "75 F." should read --- 75° F. ---.

Signed and sealed this 3rd day of December 1974.

(SEAL)
Attest:

McCOY M. GIBSON JR.          C. MARSHALL DANN
Attesting Officer            Commissioner of Patents